Patented July 19, 1932

1,867,661

UNITED STATES PATENT OFFICE

JOHN V. FREEMAN, OF BELLEROSE, NEW YORK

PROCESS OF PREPARING COLORED GRANULAR MATERIAL

No Drawing.     Application filed October 24, 1928.  Serial No. 314,848.

This invention relates to a process for preparing or treating colored granular material, such for example as granules of calcined silicates, which may be used as a substitute for natural slate or other materials in the coating of composition roofing, shingles, etc.

This application comprises a continuation in part of my co-pending application Serial No. 197,520, filed June 8th, 1927. As is stated in my said co-pending application, large dumps or accumulations of fire clay formations now exist at various coal mines. These accumulations contain a certain quantity of coal and spontaneous combustion has accordingly occurred therein, and with the oxidation of the iron pyrites present, the fire clay has been calcined and, under the prevailing conditions of heat and pressure, has been formed into large clinker-like masses, largely colored red by the iron oxide.

Upon examination it has been found that this calcined fire clay has approximately the same chemical composition and the same physical structure as the natural slates now used in granular form as a coating for shingles and other roofing. In fact, though the composition of this dump material varies, of course, in different dumps and in different parts of the same dump, yet much of it has a higher content of iron oxide ($Fe_2O_3$) and aluminum oxide ($Al_2O_3$) which are valuable ingredients, and a much lower content of combined water than natural slates, and is, therefore, a superior material for the purposes contemplated.

I have determined by successful tests that this material which is now a waste product and a source of expense for its disposal, may, when treated according to this invention, be made available with a high degree of uniformity as to color, size of granules and durability, and the product is thus well adapted as a coating for roofings and other purposes as a substitute for more expensive materials heretofore used.

It is therefore an object of this invention to provide a process for forming or treating materials of the character above indicated, which process is economical and efficient, and will yield a product having a high degree of uniformity and durability.

The invention consists in the process and steps of the process which are herein described according to a preferred manner of practicing the same, and the invention will be particularly pointed out in the appended claims.

According to my invention, a treating process is provided by which materials such as above described, or selected portions thereof, may be improved in color and color permanency to such an extent as to be superior to the materials heretofore used. This is preferably accomplished by increasing the content of iron oxide. When the process is applied to the calcined material of fire clay dumps, for example, the resulting product is of a bright red color, much more attractive than the red slate granules and other materials heretofore used, yet the color is substantially uniform, and even after a prolonged exposure to the atmosphere will not fade or run. As a source for the iron oxide in this treatment, I may also use a material such as used pickling liquor, a by-product from steel mills which would otherwise be of very little value. This is substantially a neutral solution of ferrous sulphate. It will be understood, however, that suitable solutions for the purpose may be provided artificially or otherwise from other sources.

A specific example illustrating the manner in which the process of my invention may be carried out will now be described.

A waste pickling liquor may be used which is of a density of 30 degrees Baumé, with no acidity, 10.54 per cent iron and 6.04 per cent sulphur. The degree of concentration as the liquor is produced in the steel mills, or as concentrated for economical shipment, may be modified by evaporation or by addition of water. Generally the liquor produced at the mills is about 38 degrees to 40 degrees Baumé and will be diluted to about 30 degrees. This dilution is chiefly for convenience in treating the material.

The calcined fire clay material from the dump may be ground into granules and sized to the desired ultimate size and placed in a tank of such pickling liquor and allowed to stand and soak from 12 to 24 hours. It is then withdrawn and dried and preferably calcined in the following manner.

I have found that multiple hearth roasting furnaces of the type shown, for example, in the patent to Baird 1,669,925 of May 15, 1928, are satisfactory for use in carrying out this calcining process, although it will be understood that other types of multiple hearth furnaces of the same general class may be used. A furnace for example, having 11 hearths, including a top drying hearth, may be used. The material is preferably fed on to the drying hearth, upon which it is rabbled, until comparatively dry and from which it is gradually fed at a uniform rate into the furnace. As the material is rabbled successively over the various hearths down through the furnace, I find it desirable to gradually increase the temperature. The temperatures maintained on the various hearths may, for example, be in the neighborhood of the following:

At the top or drying hearth, approximately 300° F.,

At the first hearth within the furnace, 650° F.,

At the second hearth, 875° F.

Succeeding hearths may be heated at somewhat higher temperatures, to a maximum in the neighborhood of 1050° F.

The desired temperatures in the furnace may be preferably maintained by firing with a good grade of oil distillate which avoids the introduction of any fuel and impurities which might alter the color produced.

An abundance of air, preferably preheated, is admitted to the furnace in such manner as to come into contact uniformly with the surfaces of all the granules. If the rabble arms of the furnace are rotated at a rate within the limits customary in the above mentioned class of furnaces, the material under treatment will be sufficiently rabbled on the various hearths so that all parts of the mass will be treated uniformly, yet in view of the form of rabbling means used in the above mentioned type of furnace and since no large and heavy masses of the material will be accumulated at any one point, there will be very little tendency for the particles to become abraded.

Furthermore, when the temperatures are gradually increased as above indicated, there will be no tendency for the particles to crack or become pulverized due to the heating and concurrent chemical actions. Accordingly the conditions prevailing in the furnace are such that the product will pass through the furnace and be discharged therefrom with substantially no powdering or abrasion of the granules or other alteration of the predetermined desired sizes thereof.

Products of various different, but predetermined carefully graded sizes may accordingly be made. For example, if the product is to be used for ordinary shingle coating purposes, it may be crushed before treatment and the fines removed, leaving granules which will pass through a 10 mesh screen, but not through a 40 mesh screen.

The same process may be applied with good results not only to the full red particles which constitute the major part of the dump or bank, but also to particles of other colors which occur, such as black, dark gray and greenish colors.

The iron of the waste pickling liquor or other treating liquid is very efficiently used according to this process and the same liquor may be re-used on further batches of clay material with the addition of fresh liquor as required.

With temperatures substantially as above referred to, a product of bright red color results. However, the color may be controlled by varying the temperatures. With temperatures higher than those above mentioned, the product may be given a reddish brown color. Various shades of color may be produced, depending upon the amount of the magnetic oxide which is formed, which in turn depends upon the temperatures applied and the length of time of calcination.

Apparently the gradual increasing of the temperature while the material is being slowly rabbled or otherwise agitated is essential or quite helpful in the formation of a uniform product, since such gradual heating with constant rabbling in the presence of air insures substantially uniform chemical and physical conditions throughout the mass of material.

The process of obtaining a uniform red color is applicable not only to the clay banks described, but to various materials of similar composition; such, for example, as natural slate (whether the original color be reddish or of the green and gray colors which are common), brickyard culls which are naturally of the same comparatively dull red color as the slate commonly used, broken bricks or tiles and other similar materials, natural or artificial, all of which I include in the term "ceramic" materials. Where natural green slate is used, a bronze or somewhat reddish golden granule may be produced.

Also a bright and uniform yellow product may be produced by applying the above described process at somewhat lower temperatures, not over 300° F., to certain granulated limestones. An example of a limestone which has been successfully treated for the production of yellow roofing granules showed the following percentage analysis: silica, 5.90; iron and aluminum oxides, 6.96; magnesia, 24.85; calcium, 59.32; undetermined, 2.86.

The loss on ignition of such a sample will average 45.30 per cent.

Instead of using waste pickling liquor as above referred to, the process may be carried out using solutions carrying in the neighborhood of 7½ percent of ferrous sulphate, for example. However, the shade or depth of color may be modified at will, within rather wide limits, by carrying the concentration of the solution so that more or less of the coloring ingredient is absorbed and the color may also be varied by varying the temperatures of calcination, as stated above.

The specific process described is particularly advantageous in that the solution is absorbed in the natural or artificial silicates with a high degree of uniformity so as to be permanently adhered to, or incorporated in the granules, the predetermined color becoming permanently "set" against variation even under extreme weather conditions.

An advantage in the roasting of the granules in a multiple hearth furnace as described is that there is very little abrasion. With the ordinary roasting processes it is necessary to re-screen the product to eliminate fines after re-calcination.

The roasting process of the present application may be carried out in such a way as to make re-screening unnecessary.

While the invention has been described in detail with respect to certain particular preferred examples which give satisfactory results, it will be understood by those skilled in the art after understanding the invention that various changes and modifications may be made without departing from the spirit and scope of the invention, and it is intended, therefore, in the appended claims to cover all such changes and modifications.

What is claimed as new and desired to be secured by Letters Patent is:

1. The herein described method of treating calcined clay granules to heighten and fix the color thereof, which comprises, soaking the granules in an iron solution to increase their iron content, drying the soaked granules, then feeding the granules in a substantially continuous stream throughout successive zones, subjecting the stream of granules to heat and increasing the temperature from each stream zone to the next succeeding stream zone, supplying air to the granules being heated, agitating the granules while being heated at the successive zones, and discharging the treated and color fixed granules from the last of the successive stream zones.

2. The herein described method of treating calcined clay granules to heighten and fix the color thereof, which comprises, soaking the granules in an iron solution to increase their iron content, drying the soaked granules, then feeding the granules in a substantially continuous stream throughout successive levels, subjecting the stream of granules to heat and increasing the temperature from one level to the next successive level between 650° Fahrenheit and 1050° Fahrenheit, supplying preheated air to the granules being heated, rabbling the granules short of abrasion while being heated at the different levels, and discharging the treated and color fixed granules from the last of the successive levels.

In witness whereof, I have hereunto signed my name.

JOHN V. FREEMAN.